United States Patent

[11] 3,612,300

| [72] | Inventor | Marius Berghgracht<br>Le Vieux Logis Place Jayal, Vineuil St. Firmin, France |
|------|----------|---|
| [21] | Appl. No. | 810,537 |
| [22] | Filed | Mar. 26, 1969 |
| [45] | Patented | Oct. 12, 1971 |
| [32] | Priority | Mar. 27, 1968 |
| [33] | | Luxembourg |
| [31] | | 55,769 |

[54] INSTALLATION FOR THE PALLETIZATION OF FLAT RECTANGULAR OBJECTS
10 Claims, 16 Drawing Figs.

[52] U.S. Cl. .................................................. 214/6 DK, 214/6 H, 214/6 P
[51] Int. Cl. .................................................. B65g 57/06
[50] Field of Search .......................................... 214/6 P, 6 H, 6 K, 6.5

[56] References Cited
UNITED STATES PATENTS

| 2,655,271 | 10/1953 | Cole | 214/6 P UX |
| 2,675,928 | 4/1954 | Slater | 214/6 P UX |
| 3,380,598 | 4/1968 | Marschhausen | 214/6 K |

*Primary Examiner*—Gerald M. Forlenza
*Assistant Examiner*—George F. Abraham
*Attorney*—Nolte and Nolte ABSTRACT: The installation includes means for automatically stacking the objects in superimposed layers on a pallet, each layer comprising four objects arranged so that the assembly thereof has a square outline and in such manner that each object of a following layer simultaneously rests on adjacent portions of two objects in the preceding layer.

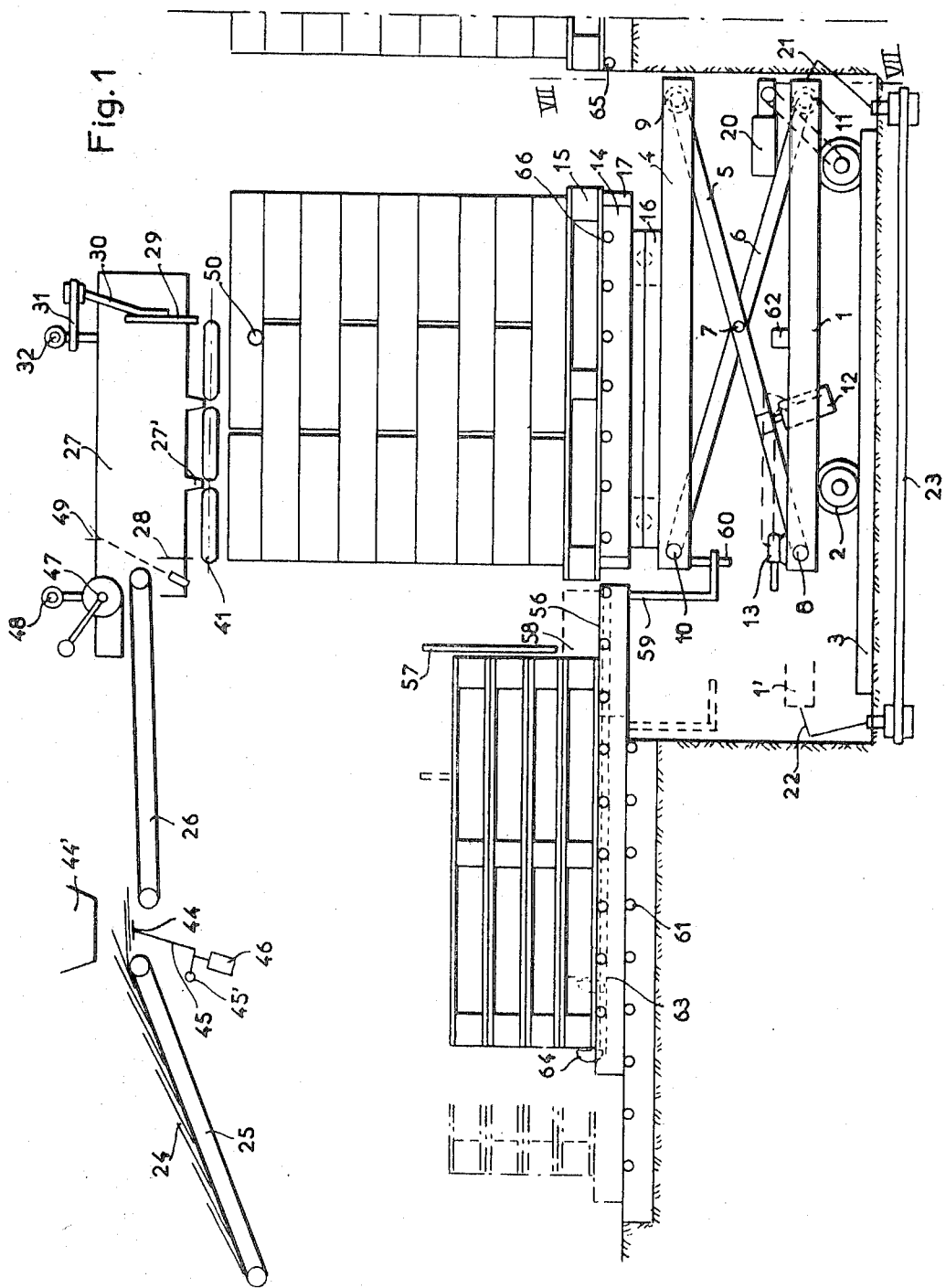

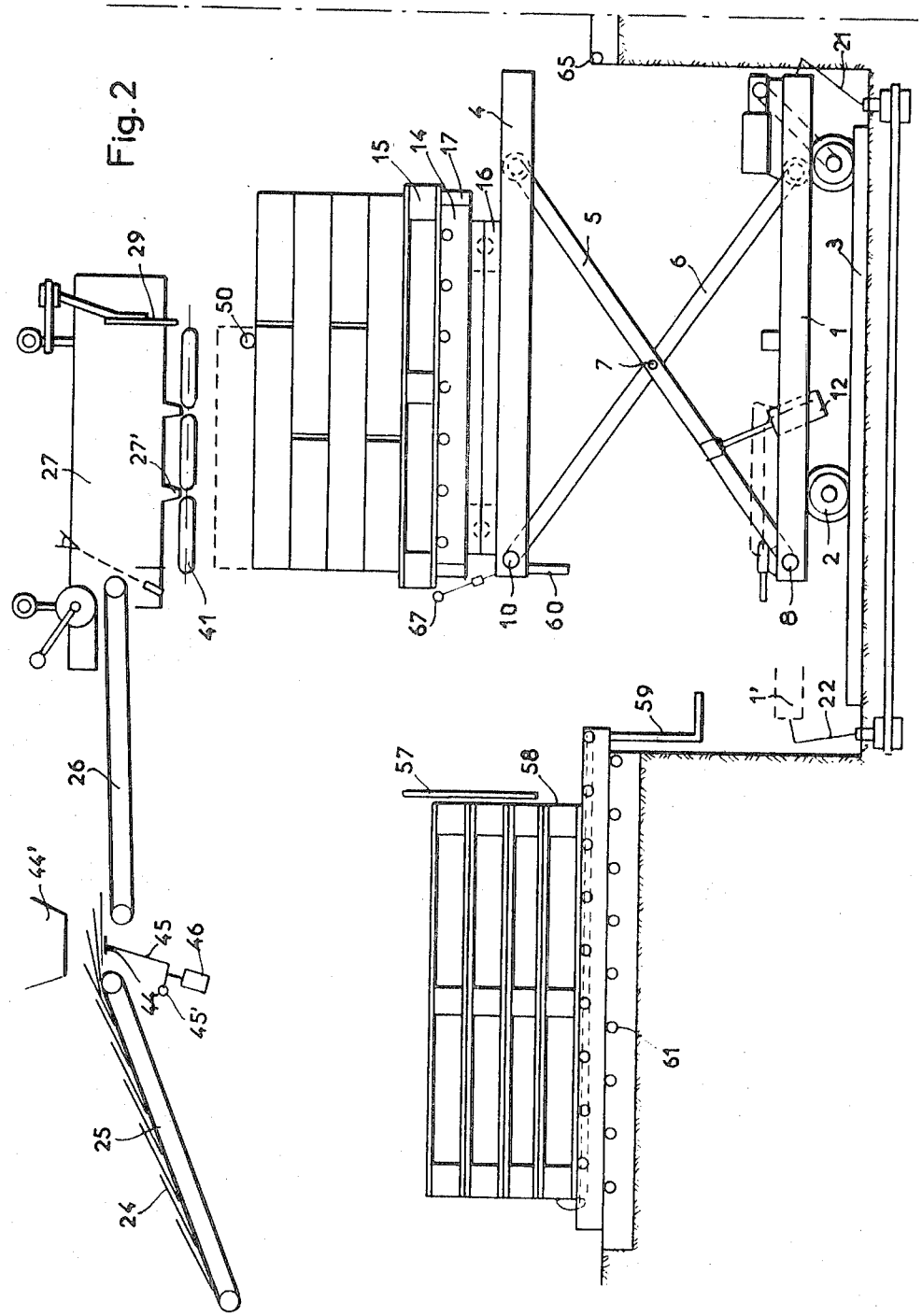

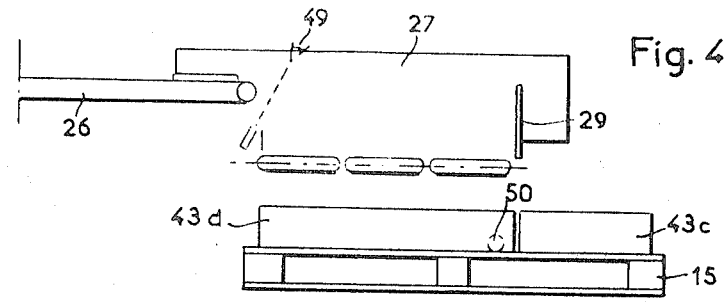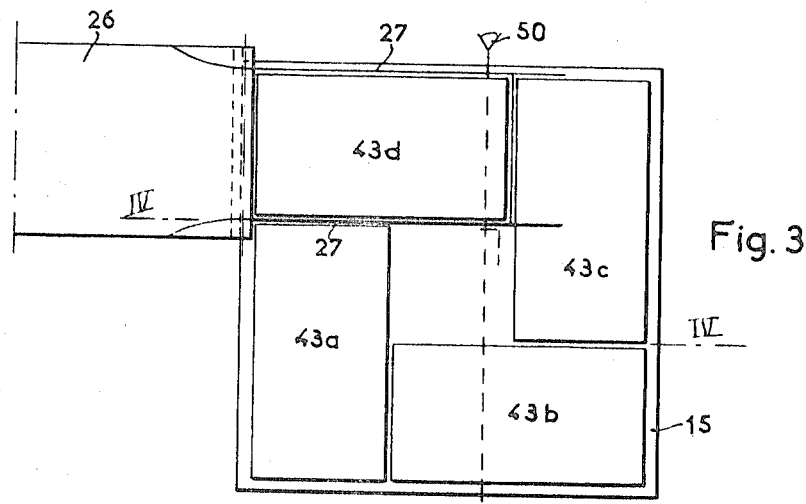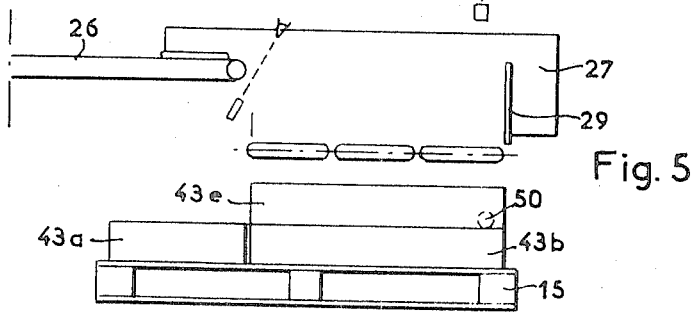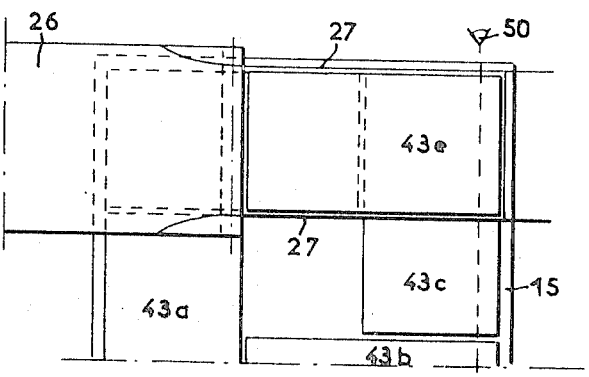

INSTALLATION FOR THE PALLETIZATION OF FLAT RECTANGULAR OBJECTS

The invention relates to an installation for the palletization of flat rectangular objects.

The term "flat object" means hereinafter either a parcel of tubes for the formation of bags, a parcel of newspapers, sheets of cardboard or the like, or one single object of approximately rectangular outline and substantially parallelepipedic shape, for instance, a bag filled with any material. Palletization comprises stacking the objects in superimposed layers on a pallet—i.e., a substantially square supporting plate. The invention relates more particularly to the construction of a pallet after the fashion of brickwork—i.e., one which is loaded in superimposed layers each comprising four flat objects each placed on an angular zone of the pallet, the objects in each layer being so disposed that they each simultaneously rest on adjacent portions of two objects in the preceding layer. The mutual offsetting of the objects in the successive layers enables very high and extremely stable stacks to be produced.

The invention relates to an installation which enables palletization to be performed automatically, this achieving a considerable saving in labor costs.

The installation according to the invention mainly comprises: a pallet-supporting plate; means for forming and depositing on the pallet successive layers each comprising four flat objects, the assembly of which has a square outline, the objects in each following layer being so disposed that each object in such layer rests on adjacent portions of two objects in the preceding layer, the means for forming each layer of four objects comprising a hopper, which is adapted to receive in succession each of the flat objects, and a rotary plate rotatable about a vertical axis to cooperate with the hopper; means for periodically transferring a flat object from the hopper to the rotary plate and then rotating the latter through 90° on itself; means for moving the pallet-carrying plate and the hopper away from one another in the vertical direction over a distance equal to the thickness of the flat objects, after each cycle of four rotations of the rotary plate through 90°; and means for producing, after each formation of a layer of four flat objects, a relative horizontal displacement, alternately to one hand or the other, of the hopper and the rotary plate, in a direction parallel with one of the two mutually perpendicular axes of a flat object in the position which it occupies in the hopper, over a distance equal to the length of the other of these axes.

The hopper adapted to receive each of the flat objects in succession must of course be understood to cover any device adapted to deliver the objects for palletization one by one.

Advantageously the hopper has an openable bottom having means for periodically opening the hopper momentarily.

In one embodiment of the invention the rotary plate itself forms the pallet-carrying plate and is supported, via the agency of an elevator mechanism, by a carriage mounted on rails and adapted to perform the said relative horizontal displacement in relation to the hopper, the elevator mechanism being adapted to produce the said vertical displacement of the rotary plate in relation to the hopper after each layer of four flat objects has been deposited on the rotary plate.

In another embodiment of the invention the rotary plate itself forms the pallet-carrying plate and is mounted at a fixed height on a carriage mounted on rails and adapted to perform the said relative horizontal displacement in relation to the hopper, while the hopper is supported by an elevator mechanism adapted to produce the said vertical displacement of the hopper in relation to the rotary plate after each layer of flat objects has been deposited on the rotary plate.

In another embodiment of the invention, the rotary plate is mounted at a fixed vertical distance below the hopper, between the hopper and a pallet-carrying plate supported by an elevator adapted to produce the said vertical movement of the pallet-carrying plate in relation to the hopper, the hopper being adapted to perform the said relative horizontal movement in relation to the rotary plate, which has an operable bottom having means for opening the bottom momentarily after each layer of four flat objects has been deposited on the bottom of the rotary plate.

In cases in which the flat objects are formed by parcels of tubes for the formation of bags, parcels of newspapers, cardboard sheets or the like, which will be referred to hereinafter by the umbrella term "tubes," the installation according to the invention can be combined with any suitable mechanism for forming the parcels and feeding them one by one at intervals into the hopper.

Other features and advantages of the invention will be gathered from the following description of a number of embodiments of the invention, with reference to the accompanying diagrammatical drawings, wherein:

FIG. 1 is an overall view of the assembly in elevation, at the end of a palletization operation;

FIG. 2 is a view similar to FIG. 1, shown when the pallet is partly loaded;

FIG. 3 is a fragmentary plan view showing the pallet and the hopper for depositing the objects thereon, at the end of the depositing of a first layer of objects on the pallet;

FIG. 4 is a sectional view, taken along the line IV—IV in FIG. 3;

FIG. 5 is a view similar to FIG. 4, at the moment when the first object of the second layer of objects is deposited on the pallet;

FIG. 6 is a plan view corresponding to FIG. 5;

Figure 7:
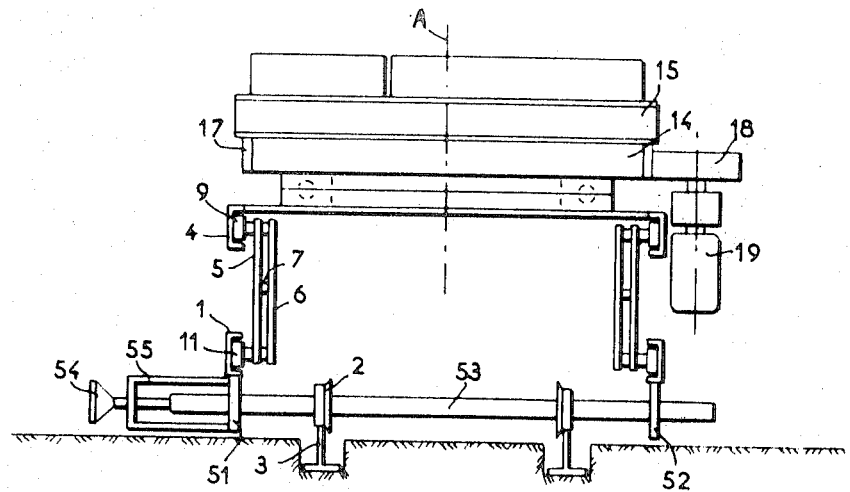
FIG. 7 is a sectional view, taken along the line VII—VII in FIG. 1.

In the embodiment illustrated in FIGS. 1–7, a carriage 1 has wheels 2 moving on rails 3 resting on the ground. The carriage 1 supports a platform 4 connected to the carriage via two pairs of arms 5, 6 articulated to one another at a place 7. Each arm 5 is pivoted at one end at a place 8 to the carriage 1 and bears at its other end a roller 9 moving on a rail unitary with the platform 4 while one end of each arm 6 pivots at place 10 on the platform 4, the other end of the arm bearing a roller 11 moving on a rail unitary with the carriage 1. A hydraulic, pneumatic or mechanical control system is provided for moving the platform 4 vertically in relation to the carriage 1, the system comprising, for instance, a jack 12 supplied by a pump 13.

A supporting plate 14 for a pallet 15 is connected by a bearing rim 16 to the platform 4. The plate 14 has a toothed rim 17 meshing with the toothed pinion 18 of an electric motor-reduction braking set 19 which is mounted laterally on the platform 4 (FIG. 7) and enables the supporting plate to be rotated on itself.

The carriage 1 bears on electric motor-reduction set 20 actuating a pair of wheels 2 to cause the carriage to make a translational movement on the rails 3, the amount of translational movement being limited in both directions by end-of-run switches 21, 22 adjustably positioned on a support 23. Each of these switches stops the carriage when the carriage reaches a switch, and the switch acts on an inverter ensuring that when the motor-reduction set 20 is next actuated the carriage will be moved in the opposite direction. In this embodiment, the amount of translational movement will be adjusted so as to correspond to the width of a flat object, for instance, a parcel of tubes.

The tubes 24 produced by a tubemaking machine (or any other flat articles of a generally rectangular shape) are disposed overlapping one another after the fashion of tiles, in the embodiment illustrated in their longitudinal direction, on an endless belt conveyor 25, which is preferably inclined, and from which the tubes pass to a second endless belt conveyor 26 disposed at a smaller distance from the conveyor 25 than the length of one tube. The upper end of the conveyor 25 is preferably disposed slightly higher than the adjacent end of the conveyor 26. It should be noted that to simplify the drawing, the conveyors 25, 26 are shown to a smaller scale than the other parts of the installation; in fact the conveyors are therefore clearly larger in relation to such other parts.

The conveyor 26 supplies the tubes to a hopper 27 in which the parcels are formed of a required predetermined number of tubes, each parcel forming one of the flat objects to be deposited on the pallet 15. The hopper comprises two sidewalls which form guides and between which two stops 28, 29 are disposed whose position can be adjusted in accordance with the length of the tubes. For instance, the stop 29 is supported by an arm 30 mounted with provision for adjustment of its position on a rod 31 supported by a rod 32 connecting the lateral walls of the hopper 27.

Figure 9:
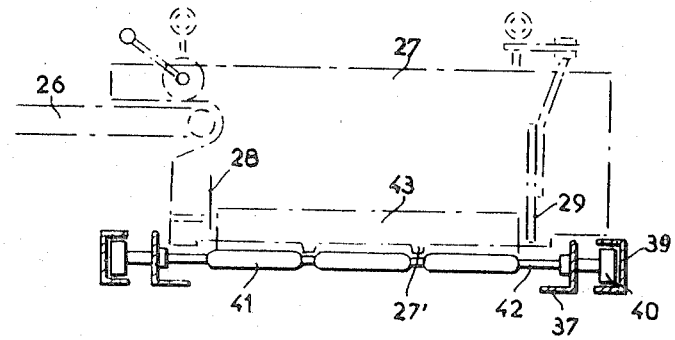
FIG. 9 is a sectional view, taken along the line IX—IX in FIG. 8.
Figure 8:
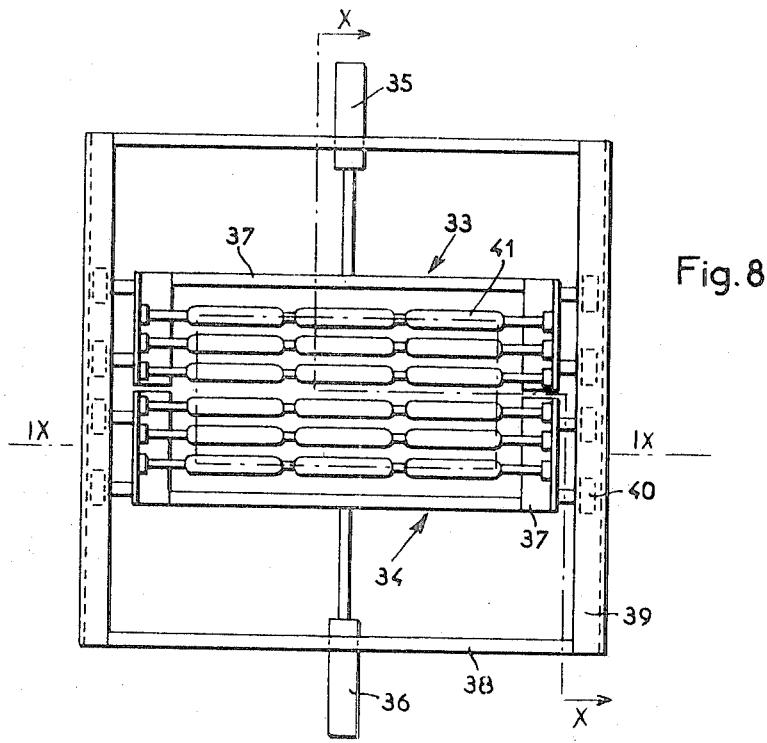
FIG. 8 is a plan view of the bottom of the hopper for depositing the objects on the pallet.
Figure 10:
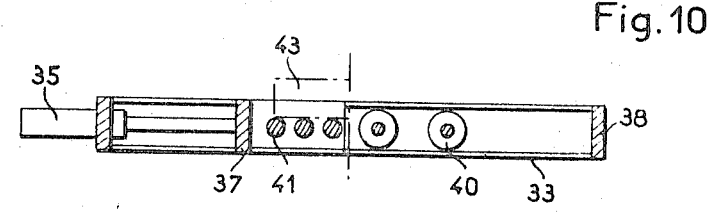
FIG. 10 is a sectional view, taken along the broken line X—X in FIG. 8.

The hopper has a mobile bottom and means for periodically opening the bottom, inter alia after each rotation of the plate 14 through 90°, thus allowing the contents of the hopper 27 to drop on to the pallet 15. According to the invention, the mobile bottom of the hopper is advantageously constructed as illustrated in FIGS. 8–10. In this embodiment, it comprises two semitrapdoors 33, 34 which can be displaced by being moved away from one another by jacks 35, 36. Each semitrapdoor comprises a rigid chassis 37 connected to one of the jacks 35, 36 mounted on a frame 38 which is disposed in a fixed position in relation to the hopper 27 and can be unitary therewith. The fixed frame 38 comprises runways 39 for rollers 40 rigidly connected to the semitrapdoors 33, 34. The chassis 37 supports series of rollers 41 which are loosely mounted on shafts 42 rigidly connected with the chassis 37. The rollers 41 form the mobile bottom of the hopper 27 and at least one of their ends is preferably conical or rounded off, to prevent the tubes 24 delivered by the conveyor 26 from getting caught. The tubes are guided by the lateral walls of the hopper 27 and stacked in the correct position by the adjustable stops 28, 29 so that the tubes are stacked in the hopper to form a well-defined parcel 43.

To prevent the or each bottom tube of a parcel from being entrained by the rollers 41 during the opening of the semitrapdoors, the lateral walls of the hopper 27 have lugs 27' extending downwardly between the rollers 41 as far as below the top level thereof.

Disposed in the gap between the conveyors 25 and 26 are means for automatically forming parcels 43 of a predetermined number of tubes 24. In an advantageous embodiment, these means comprise a series of suckers 44 disposed in an alignment perpendicular to the axis of the tubes. The suckers are mounted on an arm 45 controlled by a jack 46; the arm 45 can, for instance, be bent and pivot by its free end on a fixed pivot 45'. When the jack 46 raises the suckers 44, in which a vacuum is set up by any vacuum source, the suckers stop the tube 24 facing which they are disposed at that moment, and cause an accumulation of the following tubes supplied by the conveyor 25, which is continuously fed by the tubemaking machine (not shown) which manufactures the tubes and cuts them to the required length by means of a cutter. The vacuum source is advantageously formed by a vacuum pump having a distributor enabling the vacuum to be transmitted to the suckers or interrupted therein.

The suckers 44 are kept raised and evacuated until the moment when a number of tubes slightly lower than the required number for forming a parcel 43 have thus accumulated, while the preceding tubes, which are already on the conveyor 26, continue to be fed into the hopper 27. Since the conveyor 25 is in reality relatively long, the tubes delivered by the tubemaking machine continue to be placed normally overlapping one another after the fashion of tiles on the conveyor 25. At the said moment, the vacuum is removed from the suckers and they are lowered, so that the accumulated tubes are released and transferred to the conveyor 26. The suckers are then evacuated again and raised by the jack when the required number of tubes for forming a parcel have been transferred to the conveyor 26, so as to retain the tube immediately following—i.e., the first of the tubes which are to make up the following parcel. If, for instance, parcels are to be made up consisting of about 50 tubes, the raising of the suckers after each series of 50 tubes has passed, can be performed automatically by means of a counting device, combined, for instance, with the cutter of the tubemaking machine which cuts up the individual tubes. The suckers are therefore raised periodically in synchronism with the amount of time required to place a group of, for instance, 50 tubes on the conveyor 25, while the lowering of the suckers to release the accumulated tubes is performed shortly before each raising.

To ensure that the conveyor 26 transfers the tubes satisfactorily, a pressure wheel 47 is advantageously provided to increase the pressure of the tubes on the conveyor 26. The pressure wheel 47 is suspended from a rod 48 connecting the two lateral walls of the hopper 27.

Instead of the tubes being separated into groups of, for instance, about 50 by means of the suckers 44, this can alternatively be done by replacing the suckers by shoes which are actuated by the jack 46 and are periodically raised thereby until they press the first tubes of each group of tubes to be separated against a stop 44' shown diagrammatically in FIGS. 1 and 2.

All the tubes in each group overlap one another and interrupt the light ray of a photoelectric cell 49 disposed inside the hopper 27. After the last tube in the group has passed, the light ray is restored to the cell 49 which opens the semitrapdoors 33, 34 and allows the parcel of tubes to drop out of the hopper 27 on to the pallet, or onto the parcels already disposed on the pallet, and also recloses the semitrapdoors 33, 34 via the agency of the jacks 35, 36 and a programmed control mechanism of any known kind to produce these movements in succession. After, or possibly during the reclosing of the semitrapdoors 33, 34, this mechanism starts the motor-reduction set 19 and therefore rotates through 90° the plate 14 bearing the pallet 15, the rotation being limited to 90° every time by one of four stops (not shown) borne by the plate 14 and actuating a switch which stops the motor-reduction set 19.

These various operations are performed during the interval of time judiciously created between the arrival of the last tube of a group in the hopper 27, and the arrival of the first tube of the following group therein.

After four parcels 43a—43d have been deposited on the pallet, the plate 14 is automatically lowered by a distance corresponding to the thickness of the parcels by means of the jack 12 under the control of a photoelectric cell 50 disposed at the level occupied by an empty pallet supported by the plate 14 when the latter is brought into its top end position—i.e., the position which it occupies before the depositing of the first parcel of tubes on the pallet. The cell 50 can be read only at the end of the cycle of depositing four parcels of the same layer on the pallet. The light ray of the cell is interrupted at that moment, so that the plate 14 is automatically lowered by the jack 12 until the light ray is reestablished. To ensure that the pallet is built up after the fashion of brickwork, the cell 50 also produces via the agency of the motor-reduction set 20 a translational movement of the carriage 1 over the rails 3 until its movement is stopped by one or the other of the end-of-travel switches 21, 22 as explained hereinbefore. In this way the parcels of the following layer will be deposited in an offset position in relation to the parcels in the preceding layer, as shown in FIG. 6 for the first parcel 43e of the following layer. The second end position of the carriage 1 is shown at 1' in FIGS. 1 and 2.

A similar result can be obtained by a translational movement of the carriage transversely of the hopper 27, the rails 3 and the support 23 for the switches 21, 22 being in that case rotated through 90°, and the amount of translational movement corresponding to the length of one tube, the tubes being fed in the direction of their length into the hopper 27.

If the dimensions of the flat objects vary in width and/or in length, the hopper 27 can be adjusted by sliding the supports of its lateral surfaces over the rods 32, 48 (FIG. 1) and/or by adjusting the position of the stops 28, 29. The translational travel of the carriage 1 must therefore be adjusted in relation to the hopper 27 by means of end-of-travel switches 21, 22, by making them slide over their supporting bar 23.

To adapt the position of the plate 14 to variations in the sizes of the objects, the position of the vertical axis A of the carriage 1 may have to be displaced transversely of the rails 3. To this end, the carriage rests via sliding bearings 51, 52 on each axle rigidly connected to a pair of wheels 2 whose flanges cooperate with the rails 3 to retain the axle 53 in position. An adjusting screw 54 mounted in a support 55 rigidly connected to one, for instance, 51, of these bearings, acts on the axle 53 to displace the carriage 1 over the axle by means of its sliding bearings. The screw 54 can, for instance, engage in a screw threading of the axle 53 which in that case acts as a nut, the screw 54 being so connected to the support 55 as to prevent any axial movement of the screw. One screw 54 can be provided for one single axle 53, or for each of the two axles, in which case the screws are advantageously connected to one another so as to rotate synchronously.

The invention also provides means for changing the pallet automatically. To this end, a reserve of empty pallets is disposed on a carriage 56 one wall 57 of which is formed with a window 58 allowing a pallet to pass. The carriage 56 has a hook 59 adapted to cooperate with a pin 60 on the carriage 1. The carriage 56 normally occupies the position shown in FIG. 2 and shown in chain lines in FIG. 1. To load the last layer of objects but one on to the pallet, the carriage 1 is brought into the left-hand end position shown at 1', so that the pin 60 is above the hook 59 and will be hooked therein during the last lowering of the platform 4, whereafter the assembly of carriages 1 and 56 moves to the right for the loading of the last layer of objects on the pallet 15, the carriage 56 moving over the loosely mounted rollers 61. To remove the full pallet and replace it with an empty pallet, the interval of time available for the formation of the following parcel of tubes is conveniently prolonged. To this end, during the final lowering of the plate 14, a member (not shown) rigidly connected to the platform 4 actuates a contact 62 which is borne by the carriage 1 and delivers an item of information which is stored and will be released only after the loading of the last layer of four objects on the pallet. This released information simultaneously: (1) slows down the tubemaking machine and the conveyor 25 operating in synchronism therewith; (2) stops the mechanism actuating the jack 46 and the suckers, maintaining the vacuum, and (3) starts a motor-reduction set (not shown) rigidly connected with the carriage 56 and controlling two endless chains 63 mounted on the carriage 56, each chain bearing a lug 64, so that the lugs displace the bottom pallet disposed on the carriage 56 and repel the full pallet 15 until it is engaged on the rollway 65 whose rollers are advantageously driven. The displacement of the pallets on the plate 14 is facilitated by rollers 66 disposed thereon.

When the empty pallet arrives on the plate 14, the pallets acts on a contact 67 (FIG. 2) borne by the plate 14, and the pallet releases the contact 67 as soon as the pallet has reached its loading position. The release of the contact 67 simultaneously: (1) rapidly raises the plate 14 back into its top end position; (2) actuates the system 44–46 for separating the groups of tubes; (3) increases the speed of the tubemaking machine and the conveyor 25 to normal speed.

The carriage 56 must then be brought back into its position shown in FIG. 2; this can be done manually or automatically, for instance, by the agency of the contact 67, or else as a result of the thrust of a stop (not shown) rigidly connected to the carriage 1, during the first displacement of the latter to the left and therefore as soon as the second layer is loaded.

Clearly, the rollways for the rollers 61, 65 are aligned with the rails 3, even if the carriage 1 moves transversely in relation to the hopper 27.

Figure 11:
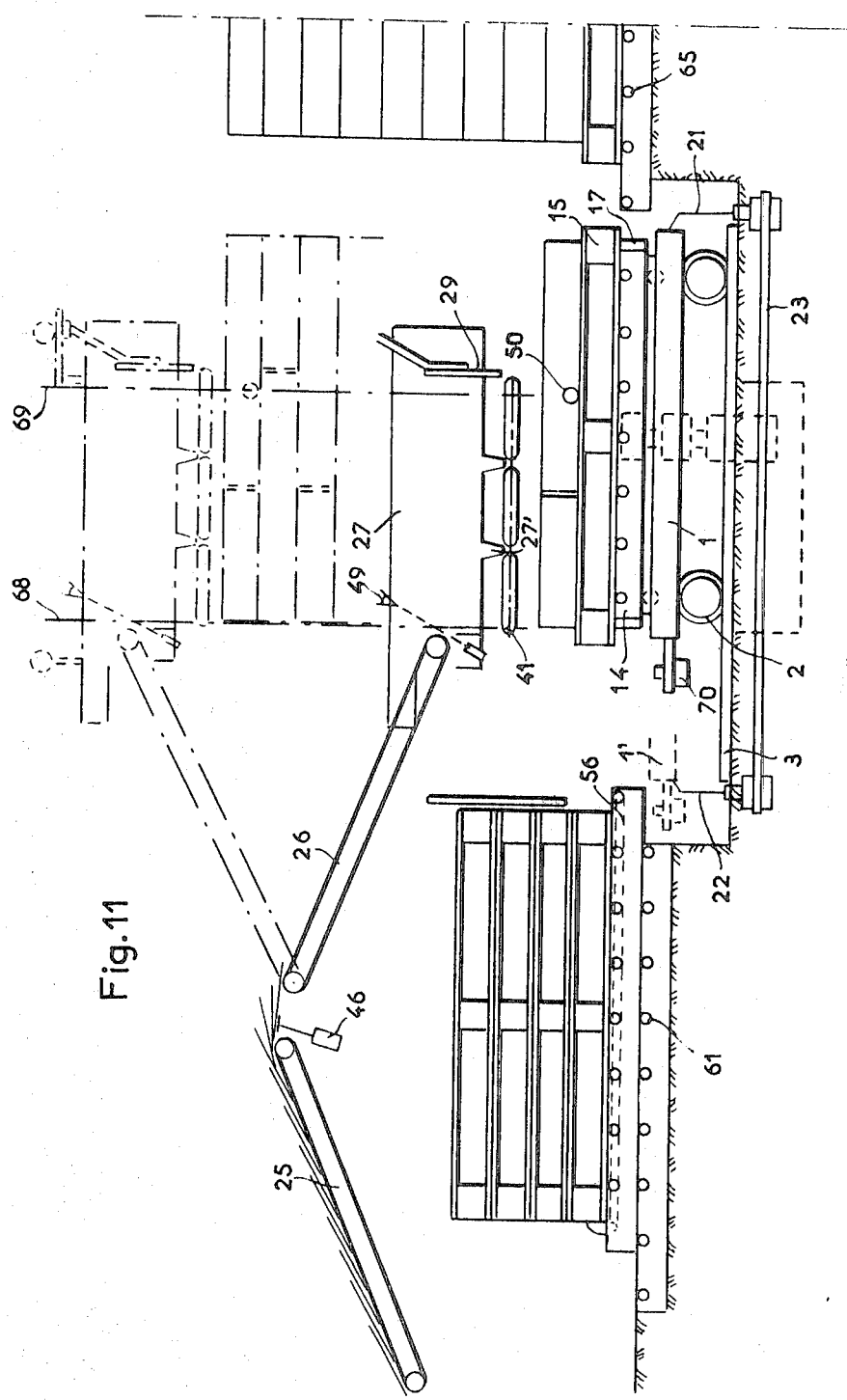
FIG. 11 is an overall elevation of a variant embodiment.
Figure 12:
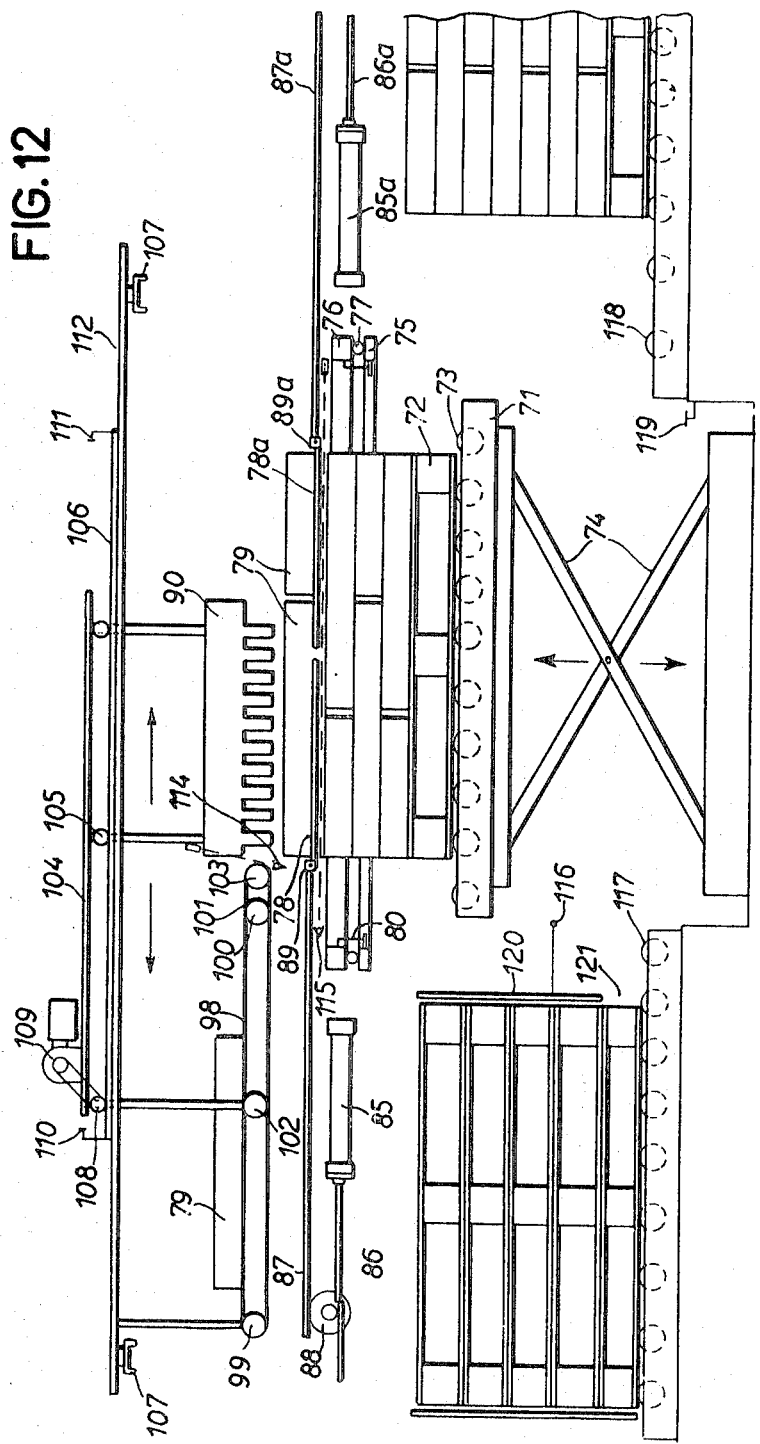
FIG. 12 is an overall elevation of another variant embodiment of the installation according to the invention.

FIG. 11 shows a variant embodiment in which the rotary plate 14, instead of being vertically displaceable in relation to the carriage 1, is mounted directly thereon and therefore has a constant level. In this case the hopper 27 can move vertically and is displaced vertically upwards as palletization proceeds, and so is that end of the conveyor 26 which is connected to the hopper. To make sure that the stacking is exactly vertical, the assembly formed by the hopper 27 and the adjacent end of the conveyor 26 is vertically guided, in any suitable manner, by vertical guides shown diagrammatically by lines 68, 69, while the other end of the conveyor 26, around which the conveyor 26 pivots, is guided by means of a substantially horizontal slide (not shown). The length of the conveyor 26 is in that case great enough for its inclination never to cause any sliding of the tubes which it bears.

In this variant embodiment, the cell 50 controlling the vertical movement of the hopper 27 in relation to the plate 14 is no longer disposed at a fixed level, but moves together with the mobile hopper 27, by means of any suitable connection. The cell 50 is therefore disposed just above the pallet 15 before the loading of the first layer of objects.

In the embodiment shown in FIG. 11, the hooking system 59, 60 shown in FIG. 1 is replaced by an electromagnet device borne by the carriage 1 and cooperating with a matching member borne by the carriage 56. The device 70 is energized when the carriage 1 has been displaced to the left for the loading of the last layer but one and entrains the carriage 56 when the carriage 1 is brought back to the right for the loading of the last layer.

Clearly, various constructional modifications can be made to the construction which is illustrated by way of example, without exceeding the scope of the present invention. For instance, the motor-reduction braking set 19, the pinion 18 and the toothed rim 17 can be replaced by other mechanical hydraulic or pneumatic means for imparting to the plate 14 rotations through 90°.

If the conveyor 26 supplies unitary objects, for instance, filled bags, or preformed parcels of tubes or the like, the hopper 27 can be simplified, for instance, it can be reduced to an openable bottom. Even the hopper and the openable bottom might be eliminated if objects of the kind specified are supplied at suitable intervals by the conveyor 26 and deposited directly on the pallet when they leave the conveyor.

FIGS. 12–16 show an embodiment having a supporting plate 71 for a pallet 72, the plate 71 having rollers 73 and being supported by an elevator 74 which can move vertically in both directions. Disposed above the plate 71 is a fixed ring 75 which is unitary with the frame of the installation and on which a supporting surface 76 can rotate via the agency of a series of balls 77 or the like. The supporting surface 76 is (via means which are not shown) formed by two grids 78, 78a, the assembly forming a rotary plate adapted to support a layer of four flat objects 79 so disposed that their assembly has a square outline. The grids can be manipulated as described hereinafter to deposit such a layer onto a pallet 72.

Figure 13:
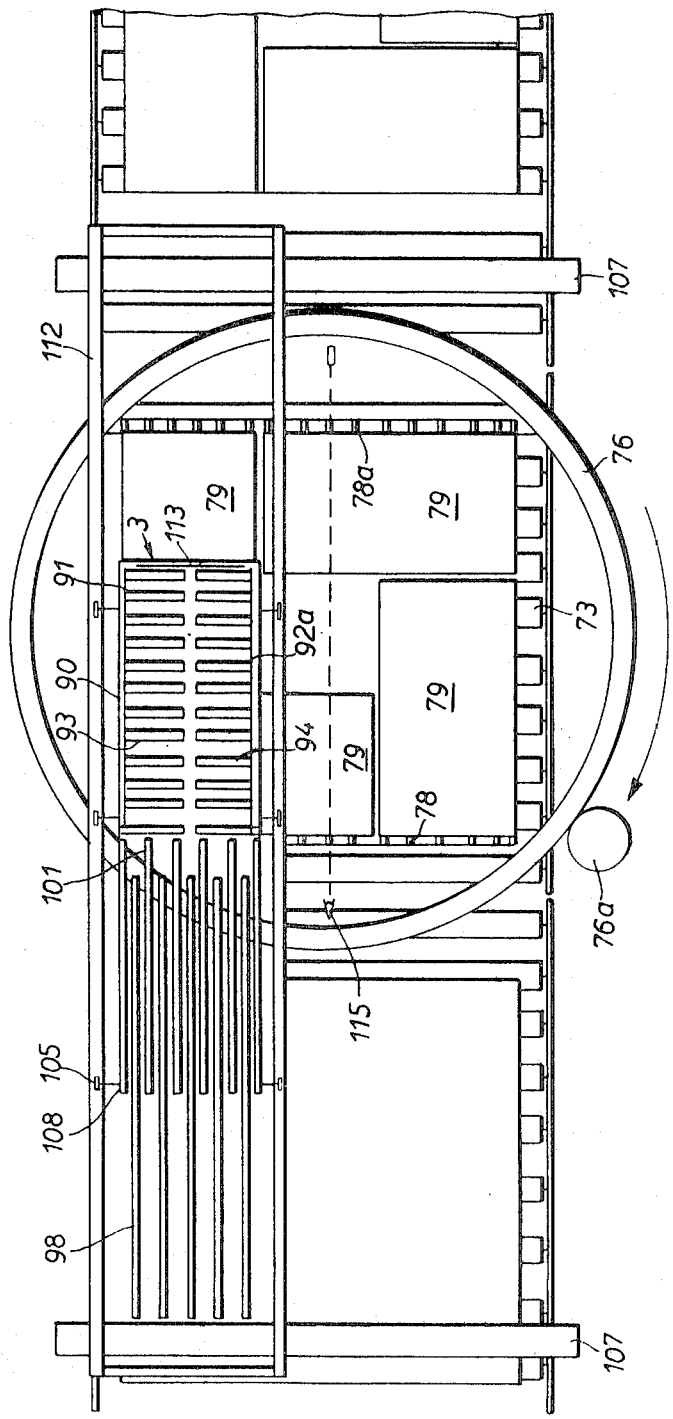
FIGS. 13 and 14 show a plan view and a side elevation thereof, respectively, various members having been omitted to simplify the drawings.
Figure 14:
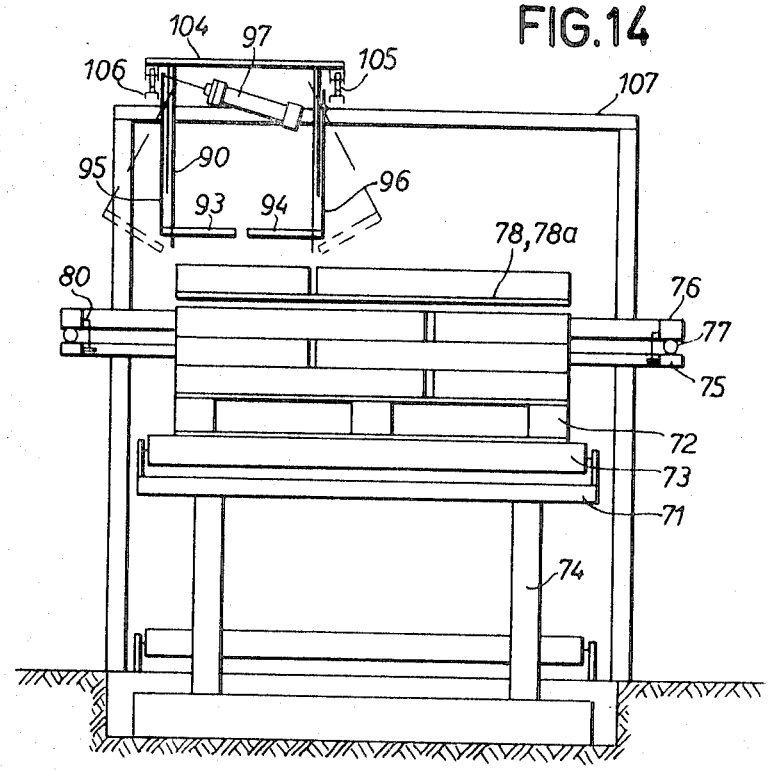
Figure 15:
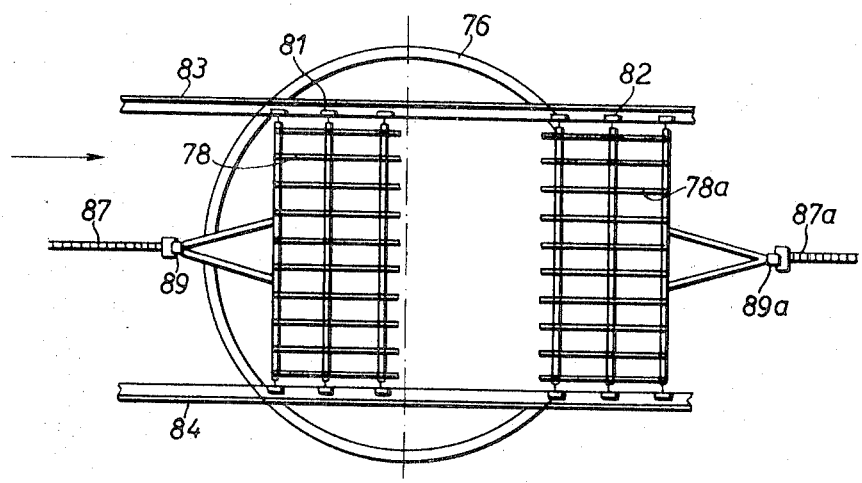

The grids can be mounted with provision for horizontal sliding in a frame (not shown) supported by the rings 76. Guides 80 are attached to the ring 76 and are in contact, for instance, via rollers with the inside of the ring 75 to make sure that the rings are centered. Any suitable drive system, as 76a (FIG. 13) enables the mobile ring 76 together with its bottom 78, 78a to be rotated around its vertical axis in the direction indicated by the arrow. When the grids 78, 78a are in the position shown in FIGS. 13 and 15, they can be moved away from one another over rollers 81, 82 on rails 83, 84. This movement can be produced by any suitable mechanism, for instance, jacks 85, 85a acting via racks 86, 87;

86a, 87a and double pinions 88, on hooks 89, 89a which hook into the ends of the racks 87, 87a in the position shown in FIGS. 13 and 15. A hopper 90 adapted to receive flat objects 79 one-by-one is disposed above the openable bottom 78, 78a and is offset in relation thereto. The hopper comprises regulatable cheeks 91, 92 to adapt its width to the width of the objects to be palletized and has an openable bottom formed, for instance, by two series of freely rotatable rollers 93, 94 supported by arms 95, 96 articulated to the hopper 90 and controlled by a jack 97. Disposed in alignment with the hopper are two belt conveyors for supplying the objects 79 to the hopper, namely a fixed-position conveyor 98 running over drums 99, 100, and a conveyor 101 which runs over drums 102, 103, the conveyors being actuated by any suitable drive means. Just like the hopper 90, the conveyor 101 is supported by a mobile chassis 104 having pairs of pinions 105 meshing with racks 106 supported by the fixed frame of the machine, the frame being shown diagrammatically by means 107. The shaft 108 of a pair of pinions 105 is actuated by a reversible motor 109 to move over an adjustable distance, between adjustable end-of-run stops 110, 111, the assembly formed by the chassis 104, the hopper 90 and the mobile conveyor 101. The conveyors 98, 101 straddle on another over a distance at least equal to the travel of the chassis 104. The racks 106 are attached to a chassis 112 which can be displaced transversely over the beams 107 of the machine frame, displacing together therewith the assembly 90, 98, 101, 104 and 106, by means of any suitable driving means (not shown).

Figure 16:
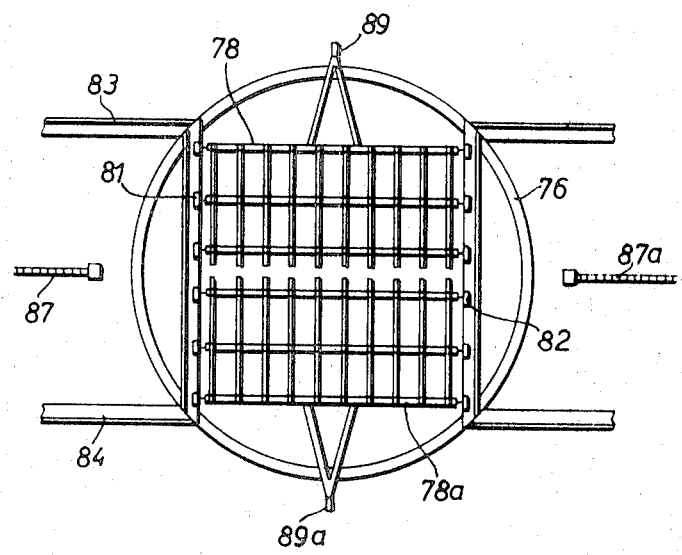
FIGS. 15 and 16 show different positions of a detail of the installation.

Palletization is performed as follows: the hopper 90, whose bottom 93, 94 is closed, is disposed in the position determined by one of the stops 110, 111, for instance 110, as shown in the drawings. A flat object 79 is introduced into the hopper 90 by means of the conveyors 98, 101 until it meets the end wall 113 of the hopper, the position of which can be adapted to the length of the objects to be dealt with. The position of the cheeks 91, 92 of the hopper is adjusted to the width of the objects, so as to make sure that they are satisfactorily guided. When it enters the hopper, the object 79 interrupts the ray of a photoelectric cell 114 borne by the hopper. As soon as the flat object is in position in the hopper, the ray reappears, thus opening the bottom 93, 94 of the hopper by acting on the jack 97, so that the object 79 drops on to the grids 78, 78a by gravity. The jack 97 then operates in the other direction to reclose the bottom 93, 94, the effect of the reclosure being to start the drive system 76a which rotates the mobile ring 76 through 90°. While these various operations are taking place, a second object 79 has arrived on the conveyors 98, 101. The second object 79 enters the hopper 90 and the aforedescribed operations are repeated to deposit the second and then the third and fourth objects 79 on to the grids 78, 78a. The closure of the bottom 93, 94 of the hopper 90 after the fourth object has been deposited on the grids 78, 78a also starts the motor 109 to displace the chassis 104, and the assembly which it supports, from the position determined by that one of the stops 110, 111 with which it was in contact, as far as the other stop. In the embodiment illustrated, the chassis 104 will therefore move to the right until it abuts the stop 111—i.e., over a distance slightly larger than the width of one object 79. The effect of this is that the following layer of four objects 79 which will be deposited on the grids 78, 78a will be so made up that after being deposited on the pallet 72 each of its objects 79 will rest on adjacent portions of two objects in the preceding layer. FIG. 16 shows the position of the grids 78, 78a after the ring 76 has rotated through 90° (270°).

When the fourth displacement of the ring 76 through 90° is completed, the bolts 89, 89a have again hooked in to the ends of the racks 87, 87a, as shown on the left of FIG. 15, the effect of which is to actuate the jacks 85, 85a and open the grids 78, 78a, as shown on the right in FIG. 15, to deposit the layer of four objects which the grids 78, 78a support on to the pallet 72 by gravity. To prevent the objects 79 from being laterally entrained by the grids 78, 78a, adjustable stops can be provided on the frame supporting the grids, the stops being disposed laterally at the outside of the objects 79 to prevent them from being entrained. The arrival of this layer of four flat objects on the pallet interrupts the ray of the photoelectric cell 115 (FIG. 12) which is supported by the machine frame and which can be read only after each cycle of four displacements of the ring 76 through 90°. The interruption of the ray of the photoelectric cell 115 makes the elevator descend over a distance equal to the thickness of one layer of objects 79. The ray then reappears and the descent of the elevator 74 is stopped, thus bringing about the return travel of the jacks 85, 85a which then reclose the grids 78, 78a and enable the latter to receive the fresh object 79 which has in the meantime been fed to the hopper 90. The cycle of operations is the repeated to deposit successive layers on the pallet 72.

After the last layer of objects but one has been deposited on the pallet 72, the plate 71 abuts a fixed contact 116 which enables the last layer to be deposited and gives the elevator 74 the order to stop its descent thereafter only when it has reached its lowest position, in which the rollers 73 of the plate 71 will be at the same level as the roller conveyors 117, 118 mounted on fixed supports in alignment with the plate 71 in its lowest position. On completing its descent, the plate 71 abuts a fixed contact 119 which starts the three roller conveyors 117, 73 and 118 which are actuated by a suitable drive means (not shown). The loaded pallet is thus transferred to the conveyor 118 and evacuated. At the same time, an empty pallet is brought from the pallet magazine 120 on to the plate 71. The magazine 120 contains a stack of pallets only the lower one of which can be entrained through a window 121. The plate 71 is then brought into its top position by the elevator 74 and the loading of the fresh pallet which it supports can begin. It can be noted that the evacuation of the loaded pallet and the positioning of an empty pallet on the plate 71 are performed in a simple and rapid manner.

The installation described hereinbefore has a number of advantages over the constructions illustrated in FIGS. 1-11. The masses brought into movement during the rotation required for constructing each layer of four flat objects are smaller, inter alia due to the fact that the layers already placed on the pallet do not take part in the rotation. Moreover, the elevator 74 is much simpler, because it comprises neither a carriage making a translational movement, nor a rotary plate. Lastly, another very important advantage is that the installation can really operate continuously, inter alia due to the fact that the time available for loading the pallet becomes four times longer, since such time corresponds to the time required for depositing four flat objects on to the grids 78, 78a. When the installation according to the invention is combined with a tubemaking machine, therefore, for palletizing parcels of tubes, there will be no need to slow down the rate of the tubemaking machine during each loading of a pallet.

Various modifications can be made to the constructions shown in FIGS. 12-16.

For instance, after each cycle of loading four flat objects on the grids 78, 78a, instead of displacing the chassis 104 and the hopper 90 over the rack 106 by a length slightly greater than the width of an object 79, the chassis 112, together with the assembly which it supports, could be displaced over the beams 107 by a distance slightly greater than the length of an object 79. In that case, instead of contacts 110, 111, end-of-run contacts should be provided on the beams 107 spaced out in accordance with the length of the object 79. Moreover, it will be understood that due to the possibility of adjusting the position of the cheeks 91, 92 and the end wall 113 of the hopper 90, and the position of the hopper, by adjusting the position of the stops 110, 111, and the position of the chassis 112 on the beams 107, and also of the end-of-run stops possibly provided thereon, the installation can be adapted to all lengths and widths of the objects 79.

Clearly, the required succession of the various movements needed for the aforedescribed operation of the installation can be performed by any suitable prior art means for carrying out programmed orders.

I claim:

1. An installation for the palletization of flat rectangular objects, characterized in that it comprises: a pallet-supporting plate; means for forming and depositing on the pallet successive layers each comprising four flat objects, the assembly of which has a square outline, the objects in each following layer being so disposed that each object in such layer rests on adjacent portions of two objects in the preceding layer, the means for forming each layer of four objects comprising a hopper including means for adjusting the magnitude receivable by the hopper of at least one of the length and the width of the object, said hopper being adapted to receive in succession each of the flat objects and a rotary plate supporting the pallet-supporting plate rotatable about a vertical axis to cooperate with the hopper; means for translating said vertical axis in a first direction parallel to at least one of the length and the width of the objects thereby to adjust the installation for a change in length or width of the objects; means for periodically transferring a flat object from the hopper to the pallet-supporting plate and then rotating the latter through 90° on itself; means for moving the pallet-supporting plate and the hopper away from one another in the vertical direction over a distance equal to the thickness of the flat objects, after each cycle of four rotations of the rotary plate through 90°; means for producing, after each formation of a layer of four flat objects, a relative horizontal displacement, alternately to one hand or the other, of the hopper and the rotary plate, in a second direction transverse to said first direction and parallel with one of the two mutually perpendicular axes of a flat object in the position which it occupies in the hopper, over a distance equal to the length of the object along the other of these axes; and means for adjusting the limits of said displacement to adjust the installation for a change in the corresponding dimension of the objects.

2. An installation as set forth in claim 1, characterized in that the rotary plate itself forms the pallet-supporting plate and is supported, via the agency of an elevator mechanism, by a carriage mounted on rails and adapted to perform the said relative horizontal displacement in relation to the hopper, the elevator mechanism being adapted to produce the said vertical displacement of the rotary plate in relation to the hopper after each layer of four flat objects has been deposited on the rotary plate.

3. An installation as set forth in claim 1, characterized in that the rotary plate itself forms the pallet-supporting plate and is mounted at a fixed height on a carriage mounted on rails and adapted to perform the said relative horizontal displacement in relation to the hopper, while the hopper is supported by an elevator mechanism adapted to produce the said vertical displacement of the hopper in relation to the said plate after each layer of flat objects has been deposited on this plate.

4. An installation as set forth in claim 1, characterized in that the rotary plate itself forms the pallet-supporting plate and is mounted on a carriage mounted on rails and adapted to perform the relative horizontal movement in relation to the hopper, the said plate being mounted on the carriage in a position which is adjustable transversely of the direction of the said horizontal movement of the carriage.

5. An installation as set forth in claim 1, characterized in that the rotary plate is disposed between the hopper and a pallet-supporting plate supported by an elevator adapted to produce the said vertical movement of the pallet-supporting plate in relation to the hopper, the hopper being adapted to perform the said relative horizontal movement in relation to the rotary plate, said rotary plate having a surface manipulatable to form an opening momentarily after each layer of four flat objects has been deposited on said surface in order to transfer the said layer of four flat objects onto the pallet-supporting plate.

6. An installation as set forth in claim 5, characterized in that the hopper is displaceably mounted on a guide track extending in the direction of the said relative horizontal movement, the guide track being borne by a frame which can be displaced in a direction transverse of the said horizontal movement.

7. An installation as set forth in claim 1, characterized in that the hopper has an openable bottom and means for periodically opening the bottom momentarily.

8. An installation as set forth in claim 7, characterized in that disposed at the inlet to the hopper is a photoelectric cell whose ray is interrupted by a flat object during its entry into the hopper, while the reappearance of the ray after a flat object has completely entered the hopper successively opens the hopper bottom, rotates the rotary plate through 90°, and recloses the hopper bottom.

9. An installation as set forth in claim 1, characterized in that it comprises a horizontal ray photoelectric cell disposed in a fixed vertical position below the hopper, so that the photoelectric cell is at the bottom level of the layer of four flat objects which is to be loaded on to the pallet-carrying plate, the photoelectric cell being actuated after the layer has been deposited on the plate and thus moving the supporting plate and the hopper apart from one another vertically until its ray is no longer interrupted by such layer.

10. An installation as set forth in claim 1, characterized in that it comprises a magazine containing a stack of empty pallets resting on a conveyor which can be actuated in the direction of the pallet-carrying plate, the magazine being formed on the side of this plate with an aperture which is slightly higher than the height of a pallet, the pallet-carrying plate comprising a conveyor supporting a pallet and disposed at the level of the first-mentioned conveyor when the pallet-carrying plate is in its lowest position and the pallet which it supports has been completely loaded, a third conveyor being disposed at the level of the first-mentioned conveyor, on the other side of the pallet-carrying plate, and means being provided to actuate the three conveyors when the pallet on the pallet-carrying plate has been completely loaded, so as to bring the loaded pallet on to the third conveyor and bring an empty pallet on to the pallet-carrying plate.